United States Patent [19]

Furukawa et al.

[11] Patent Number: 5,407,986
[45] Date of Patent: Apr. 18, 1995

[54] POLYAMIDE RESIN COMPOSITION

[75] Inventors: Haruhido Furukawa; Akihiko Shirahata, both of Chiba, Japan

[73] Assignee: Dow Corning Toray Silicone Co., Ltd., Tokyo, Japan

[21] Appl. No.: 98,676

[22] Filed: Jul. 28, 1993

[30] Foreign Application Priority Data

Jul. 30, 1992 [JP] Japan .................. 4-223251

[51] Int. Cl.$^6$ ............................................. C08K 5/54
[52] U.S. Cl. ............................ 524/262; 524/267; 525/431
[58] Field of Search ............... 524/267, 262; 525/431

[56] References Cited

U.S. PATENT DOCUMENTS 4,472,556  9/1984  Lipowitz .......................... 525/106
4,761,445  8/1988  Chiba ............................... 524/262
5,006,581  4/1991  Nakane et al. ................... 524/266

Primary Examiner—Ralph H. Dean
Attorney, Agent, or Firm—Alexander Weitz

[57] ABSTRACT

There is disclosed a polyamide molding composition characterized by excellent moldability, release and lubricity, said composition comprising:

(A) 100 parts by weight of a polyamide resin;
(B) 0.1 to 120 parts by weight of a polydiorganosiloxane that contains neither carboxyl nor amino groups; and
(C) a polysiloxane selected from the group consisting of carboxyl-containing polydiorganosiloxane and amino-containing polydiorganosiloxane, the amount of said polysiloxane (C) being 0.01 to 50 parts by weight for each 100 parts by weight of said component (B).

8 Claims, No Drawings

POLYAMIDE RESIN COMPOSITION

FIELD OF THE INVENTION

The present invention relates to a polyamide resin composition.

BACKGROUND OF THE INVENTION

Silicone resins and particularly the polydiorganosiloxanes known as silicone oils and silicone gums are widely used as additives for improving the moldability, slip or lubricity, releasability, and mechanical properties of common organic resins.

However, it has been difficult to mix common organic resins and this type of polydiorganosiloxane into a homogeneous dispersion. For example, inadequate mixing is obtained when this type of organopolysiloxane and organic resin are mixed using typical mixers due to defective feeding at the mixer inlet or slip during mixing. Moreover, moldings fabricated from compositions that contain this type of polyorganosiloxane exhibit such problems as bleed out by the polydiorganosiloxane onto the surface of the molding, poor appearance due to phase separation of the two materials at the surface of the molding, reduced mechanical strength, and substantial variations in release, lubrication, and mechanical properties. In the case of admixture of polydimethylsiloxane into polyamide resin, the preceding problems are particularly likely to appear due to the poor miscibility between these two systems.

SUMMARY OF THE INVENTION

The inventors discovered that the above problems can be solved when a special polydiorganosiloxane is present as a third component during the mixing of polyamide resin and polydimethylsiloxane.

The present invention takes as its object the introduction of a highly moldable polyamide resin composition that has excellent release and lubrication properties. A further object of the present invention is the introduction of a polyamide resin composition that is highly qualified for application as an additive for modifying polyamide resins. The aforesaid objects are achieved by a polyamide resin composition that comprises:

(A) 100 weight parts of a polyamide resin;
(B) 0.1 to 120 weight parts of a polydiorganosiloxane that contains neither carboxyl nor amino groups; and
(C) a carboxyl-containing polydiorganosiloxane or an amino-containing polydiorganosiloxane at a level of 0.01 to 50 weight parts per 100 weight parts component (B).

DETAILED DESCRIPTION OF THE INVENTION

The polyamide resin used as component (A) in the instant invention comprises thermoplastic resins generally known as polyamide resins, and no specific restriction obtains as to its type. These polyamide resins are polymers that contain the acid amide bond (-CONH-) and are exemplified by polycaprolactam (nylon 6), polyhexamethylene adipamide (nylon 66), polyhexamethylene sebacamide (nylon 610), nylon 6/nylon 66 copolymers, nylon 66/nylon 610 copolymers, inter alia.

The polydiorganosiloxane comprising component (B) of the present invention consists of polymer, generally known as silicone oil or silicone gum, whose principal skeleton is a chain of diorganosiloxane units $(R_2SiO)_n$ in which R, is independently selected from substituted or unsubstituted monovalent hydrocarbon groups, for example, alkyl groups such as methyl, ethyl, propyl; alkenyl groups such as vinyl, allyl; and aryl groups such as phenyl. This polydiorganosiloxane is exemplified by trimethylsiloxy-terminated polydimethylsiloxanes, dimethylhydroxysiloxy-terminated polydimethylsiloxanes, trimethylsiloxy-terminated methylphenylsiloxane-dimethylsiloxane copolymers, trimethylsiloxy-terminated diphenylsiloxane-dimethylsiloxane copolymers, trimethylsiloxy-terminated dimethylsiloxane-methylvinylsiloxane copolymers, dimethylvinylsiloxy-terminated dimethylpolysiloxanes, dimethylvinylsiloxy-terminated dimethylsiloxane-methylvinylsiloxane copolymers, and the like. Preferably, component (B) has a viscosity of at least 1,000,000 centistokes at 25° C.

Component (B) is to be added at 0.1 to 120 weight parts per 100 weight parts polyamide resin (A). Improvements in the moldability, release properties, lubricity, mechanical properties, etc., do not appear at an addition of less than 0.1 weight part component (B). On the other hand, at additions in excess of 120 weight parts, the volumetric ratio of component (B) to the polyamide resin becomes so high that the polyamide resin composition of the present invention will not be a solid.

Component (C) of the present invention functions to improve the miscibility between the polyamide resin (A) and the polydiorganosiloxane (B).

The carboxyl-containing polydiorganosiloxane encompassed by the polydiorganosiloxanes comprising component (C) is exemplified by compounds with the following structures.

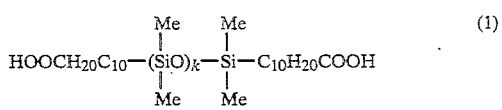

wherein k=2 to 300 and Me hereinafter denotes a methyl radical

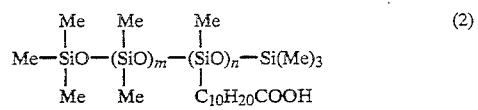

wherein m and n are each integers with values of at least 1, m+n=2 to 300 and n/(m+n)=0.1 to 0.5.

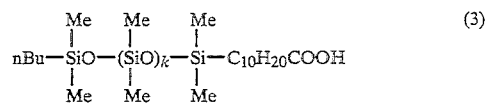

wherein nBu=normal-butyl and k=2 to 300.

The carboxyl-containing polydiorganosiloxane can be synthesized, for example, by an addition reaction between an organic compound carrying both the allyl and carboxyl groups and a diorganopolysiloxane bearing silicon-bonded hydrogen at both terminals or along the chain. The carboxyl-containing polydiorganosiloxane is further exemplified by the carboxyl-containing polydiorganosiloxane afforded by the condensation reaction between dicarboxylic acid and polydiorganosiloxane, having the amino group at both terminals or along the chain. Dicarboxylic acids that can be used in this latter reaction are exemplified by saturated aliphatic dicarboxylic acids such as adipic acid; by unsaturated aliphatic dicarboxylic acids such as maleic acid; and by aromatic dicarboxylic acids such as phthalic acid. In this invention, these condensation reaction products of dicarboxylic acids and polydiorganosiloxane having the amino group are particularly desired.

The amino-containing polydiorganosiloxane is exemplified by the following compounds.

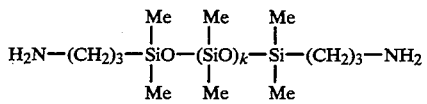

wherein k=2 to 300.

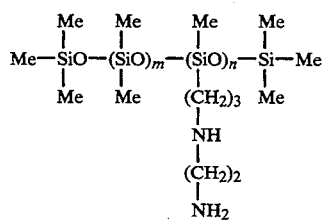

wherein m and n are both integers with values of at least 1, m+n=2 to 300 and n/(m+n)=0.1 to 0.5.

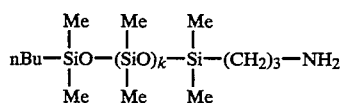

wherein nBu=normal-butyl and k=2 to 300.

Methods for the synthesis of this amino-containing polyorganosiloxane are known. For example, it can be synthesized by an addition reaction between an organic compound carrying amino and allyl groups and diorganopolysiloxane having silicon-bonded hydrogen at both terminals or along the chain. This method is ordinarily implemented by protecting the amino group with a silylating agent before the addition reaction and desilylating after completion of the addition reaction. This amino-containing polydiorganosiloxane is further exemplified by the amino-containing polydiorganosiloxanes afforded by condensation of a diamine with polydiorganosiloxane carrying the carboxyl group at both terminals or along the chain. Diamines operable in this latter method are exemplified by aliphatic diamines such as hexamethylenediamine, and by aromatic diamines such as phenylenediamine.

In order to support the function of component (C), i.e., inducing an improvement in the miscibility between components (A) and (B), the polydiorganosiloxane block in component (C) preferably has the same chemical structure as the polydiorganosiloxane comprising component (B). For example, the polydiorganosiloxane block in component (C) is preferably polydimethylsiloxane when component (B) is polydimethylsiloxane, and is preferably polyphenylmethylsiloxane when component (B) is polyphenylmethylsiloxane. The component (C) used by the present invention is to be added at 0.01 to 50 weight parts per 100 weight parts of component (B).

The polyamide resin composition of the instant invention has an excellent moldability and can be converted into moldings that have excellent release and lubrication properties. Insofar as concerns its application as a modifier of polyamide resins, polyamide resin compositions containing it are free of the defective feeding, slip, etc., that can appear at the mixer. Moreover, in this case the polydiorganosiloxane is rapidly dispersed and the stability of the dispersed particles is improved.

Moldings produced from a polyamide resin composition of the present invention are free of problems such as bleeding by the polydiorganosiloxane onto the surface of the molding, undesirable appearance due to phase separation between the two materials, and so forth. Compared to the simple blend of polyamide resins with polydiorganosiloxane, such moldings manifest less variation in their release, lubrication, and mechanical properties and also have an improved mechanical strength.

EXAMPLES

The present invention is explained in greater detail below with reference to illustrative examples. In the examples, the viscosity was measured at 25° C. and "cs" is an abbreviation for centistokes.

REFERENCE EXAMPLE 1

Synthesis of Carboxyl-Containing Organopolysiloxane

Adipic acid (22.48 g; 0.154 moles) and 100 g of xylene were placed in a flask equipped with a Dean-Stark distillation tube and heated under reflux with stirring. One hundred grams (0.077 moles) of alpha, omega-3-aminopropyldimethylsilyldimethylpolysiloxane (molecular weight=1,300, amino equivalent weight=650) was then gradually dripped in from an addition funnel while continuing to heat at reflux under a nitrogen purge and measuring the amount of water accumulated in the distillation tube. A reflux drip was continued until the production of water ceased, at which point 2.8 g of water had accumulated in the distillation tube. The xylene was removed by heating the reaction mixture at reduced pressure while stirring to yield 95 g of carboxyl-containing polyorganosiloxane. This polysiloxane contained 5.8 weight % carboxyl group.

REFERENCE EXAMPLE 2

Synthesis of Carboxyl-Containing Organopolysiloxane

Adipic acid (3.95 g) and 100 g of xylene were placed in a flask equipped with a Dean-Stark distillation tube and heated under reflux with stirring. One hundred grams of a dimethylsiloxane/gamma-(2-aminoethyl)aminopropylmethylsiloxane copolymer (molecular weight=7,400, amino equivalent weight=3,700) was then gradually dripped in from an addition funnel while continuing to heat at reflux under a nitrogen purge and measuring the amount of water accumulated in the distillation tube. A reflux drip was continued until the production of water ceased at which point 0.49 g of water had accumulated in the distillation tube. The xylene was removed by heating the reaction mixture at reduced pressure while stirring to yield 80 g of carboxyl-containing polyorganosiloxane. This polysiloxane contained 1.4 weight % carboxyl group.

EXAMPLE 1

Twenty one grams of a polyamide resin (product of Toray Kabushiki Kaisha, brandname: Amilan CM3001-N), 7.0 g of polydimethylsiloxane having a viscosity of 1 million cs, and 1.05 g of the carboxyl-containing polyorganosiloxane of Reference Example 1 were placed in a 30 cc Lab Plast mill. A solid, light-brown polyamide resin composition was obtained by mixing for 10 minutes at 100 rpm and 290° C. This brown solid was cooled with liquid nitrogen and then pulverized with a hammer. The fragments were heated under reflux in n-hexane for 2 hours in order to elute the polydimethylsiloxane dispersed in the polyamide resin. Fracture surfaces on the fragments were subsequently inspected using a scanning electron microscope, and the average diameter of the voids that had contained the polydimethylsiloxane was measured on the fracture surfaces. The result of this measurement is reported in Table 1 below.

EXAMPLE 2

Twenty one grams of a polyamide resin (product of Toray Kabushiki Kaisha, brandname: Amilan CM3001-N), 7.0 g polydimethylsiloxane having a viscosity of 1 million cs, and 0.35 g of the carboxyl-containing polyorganosiloxane of Reference Example 1 were placed in a 30 cc Lab Plast mill. A solid, light-brown polyamide resin composition was obtained by mixing for 10 minutes at 100 rpm and 290° C. This brown solid was cooled, pulverized and analyzed as described in Example 1, the results being reported in Table 1.

EXAMPLE 3

Twenty one grams of polyamide resin (product of Toray Kabushiki Kaisha, brandname: Amilan CM3001-N), 7.0 g of polydimethylsiloxane having a viscosity of 1 million cs, and 0.35 g of the carboxyl-containing polyorganosiloxane of Reference Example 2 were placed in a 30 cc Lab Plast mill. A solid, light-brown polyamide resin composition was obtained by mixing for 10 minutes at 100 rpm and 290° C. This brown solid was cooled, pulverized and analyzed as in Example 1, the results being presented in Table 1.

EXAMPLE 4

Twenty one grams of a polyamide resin (product of Toray Kabushiki Kaisha, brandname: Amilan CM3001-N), 7.0 g of polydimethylsiloxane having a viscosity of 1 million cs, and 1.05 g of a polyorganosiloxane carrying the amino group at both terminals (product of Dow Corning Toray Silicone Company, Limited, brandname: BY16-853) were placed in a 30 cc Lab Plast mill. A solid, light-brown polyamide resin composition was obtained by mixing for 10 minutes at 100 rpm and 290° C. This brown solid was cooled, pulverized and analyzed as in Example 1, the results being presented in Table 1.

(COMPARISON) EXAMPLE 1

A polyamide resin composition was produced as in Example 1, but in this case omitting the carboxyl-containing polyorganosiloxane of Reference Example 1. This composition was measured as in Example 1, and the result of this measurement is reported in Table 1 below.

EXAMPLE 5

Six hundred grams of a polyamide resin (product of Toray Kabushiki Kaisha, brandname: Amilan CM3001-N), 400 g of polydimethylsiloxane having a viscosity of 1 million cs, and 60 g of the carboxyl-containing polyorganosiloxane of Reference Example 1 were placed in a 20 L Super Mixer (from Kabushiki Kaisha Kawada Seisakusho) and mixed for 5 minutes at 700 rpm. The resulting mixture was continuously supplied to a twin-screw extruder and mixed while heating (100 rpm, cylinder and die temperatures=290° C.) to produce a thermoplastic resin composition. Master pellets were obtained by extruding the composition in strand form, water-cooling, cutting with a pelletizer, and drying at 70° C. for 7 hours.

The above polyamide resin (875 g) (Amilan CM3001-N) and 125 g of the above-described master pellets were placed in a 20 L Super Mixer and mixed for 3 minutes at 100 rpm. This was followed by the production of pellets as described above using a twin-screw extruder. These pellets were injection molded using a screw-type injection molder at a cylinder temperature of 280° C. into 70° C. molds to produce the following specimens: JIS No. 2 dumbbell, Izod impact test specimen (using a notch-equipped mold), a thrust friction wear test disk, and a cylindrical molding. These test specimens were immediately placed in a desiccator and were stored there until immediately prior to testing. The appearance was visually evaluated using the dumbbell molding. Tensile testing was conducted based on JIS K-7113, and Izod impact testing was run based on the method of JIS K-7110. The sliding coefficient of friction at 1 kg/cm$^2$ and the critical PV value were measured using a thrust friction wear tester from Toyo Seiki Kabushiki Kaisha. The results of these evaluations are reported below in Table 2.

(COMPARISON) EXAMPLE 2

A polyamide resin composition was produced as in Example 5, but in this case omitting the carboxyl-containing polyorganosiloxane of Reference Example 1 that was used in Example 5. The properties of this polyamide resin were measured as in Example 5, and the results of these measurements are reported in Table 2 below.

TABLE 1

|  | appearance | diameter of the dispersed particles of the polydimethylsiloxane phase (micrometers) |
|---|---|---|
| Example 1 | milky brown | 1-2 |
| Example 2 | milky brown | 3 |
| Example 3 | milky brown | 1-2 |
| Example 4 | milky brown | 3 |
| (Comparison) Example 1 | brown | 35 |

TABLE 2

|  | unit | Example 5 | (Comparison) Example 2 |
|---|---|---|---|
| appearance | — | excellent | A nonuniform surface condition was observed. Flow marks have been produced. Poor surface gloss. |
| tensile strength | kg/mm$^2$ | 760 | 760 |
| tensile elongation | % | 60 | 20 |
| Izod strength | kg·cm/cm | 7.2 | 5.0 |
| coefficient of friction | — | 0.9 | 1.0 |
| variation in the coefficient of friction | — | 0.01 | 0.1 |

That which is claimed is:

1. A composition comprising:
   (A) 100 parts by weight of a polyamide resin;
   (B) 0.1 to 120 parts by weight of a polydiorganosiloxane that contains neither carboxyl nor amino groups; and
   (C) a polysiloxane selected from the group consisting of carboxyl-containing polydiorganosiloxane prepared by reacting a dicarboxylic acid and an amino group-containing polydiorganosiloxane and amino-containing polydiorganosiloxane prepared by condensing a diamine with a carboxyl group-containing polydiorganosiloxane, the amount of said polysiloxane (C) being 0.01 to 50 parts by weight for each 100 parts by weight of said component (B).

2. The composition according to claim 1, wherein said polysiloxane (C) is prepared by reacting a dicarboxylic acid and an amino group-containing polydimethylsiloxane and said dicarboxylic acid is selected from the group consisting of adipic acid, maleic acid and phthalic acid.

3. The composition according to claim 2, wherein said polydiorganosiloxane (B) is a polydimethylsiloxane.

4. The composition according to claim 1, wherein said polysiloxane (C) is prepared by condensing a diamine with a carboxyl group-containing polydimethylsiloxane and said diamine is selected from the group consisting of hexamethylenediamine and phenylenediamine.

5. The composition according to claim 4, wherein said polydiorganosiloxane (B) is a polydimethylsiloxane.

6. In a method for modifying the properties of a polyamide resin, said method comprising dispersing a silicone-containing composition in said resin, the improvement comprising dispersing components (B) and (C) in component (A) of claim 1.

7. In a method for modifying the properties of a polyamide resin, said method comprising dispersing a silicone-containing composition in said resin, the improvement comprising dispersing components (B) and (C) in component (A) of claim 3.

8. In a method for modifying the properties of a polyamide resin, said method comprising dispersing a silicone-containing composition in said resin, the improvement comprising dispersing components (B) and (C) in component (A) of claim 5.

* * * * *